US011927386B2

United States Patent
Jung et al.

(10) Patent No.: US 11,927,386 B2
(45) Date of Patent: Mar. 12, 2024

(54) VACUUM ADIABATIC BODY AND REFRIGERATOR

(71) Applicant: LG ELECTRONICS INC., Seoul (KR)

(72) Inventors: Wonyeong Jung, Seoul (KR); Deokhyun Youn, Seoul (KR); Sora Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/155,430

(22) Filed: Jan. 22, 2021

(65) Prior Publication Data
US 2021/0140705 A1     May 13, 2021

Related U.S. Application Data

(63) Continuation of application No. 15/749,154, filed as application No. PCT/KR2016/008505 on Aug. 2, 2016, now Pat. No. 10,928,119.

(30) Foreign Application Priority Data

Aug. 3, 2015    (KR) .................. 10-2015-0109627

(51) Int. Cl.
*F25D 23/06*      (2006.01)
*E06B 3/663*      (2006.01)
(Continued)

(52) U.S. Cl.
CPC ........ *F25D 23/063* (2013.01); *E06B 3/66304* (2013.01); *F16L 59/065* (2013.01);
(Continued)

(58) Field of Classification Search
CPC .... F25D 19/006; F25D 23/062; F25D 23/063; F25D 23/064; F25D 23/028;
(Continued)

(56) References Cited

U.S. PATENT DOCUMENTS

| 1,413,169 A | 4/1922 | Lawton |
| 1,588,707 A | 6/1926 | Csiga |

(Continued)

FOREIGN PATENT DOCUMENTS

| CN | 1132346 | 10/1996 |
| CN | 1191959 | 9/1998 |

(Continued)

OTHER PUBLICATIONS

Chinese Office Action dated May 18, 2022 issued in CN Application No. 202110718315.X.

(Continued)

*Primary Examiner* — Joseph F Trpisovsky
(74) *Attorney, Agent, or Firm* — KED & ASSOCIATES, LLP

(57) ABSTRACT

A vacuum adiabatic body includes a first plate, a second plate, a seal to create a vacuum between the first and second plates, and a support to maintain a distance between the first and second plates. At least one of the first or second plates may have a predetermined thickness. The support includes a plurality of bars or posts interposed between the first and second plates and arranged in a grid having a predetermined pitch. A bending angle may be formed between points corresponding to where the plurality of bars are provided and points corresponding to positions that are furthest away from the bars.

20 Claims, 8 Drawing Sheets

(51) Int. Cl.
  *F16L 59/065* (2006.01)
  *F25D 19/00* (2006.01)
  *F25D 23/08* (2006.01)
  *F25D 23/02* (2006.01)

(52) U.S. Cl.
  CPC ........ F25D 19/006 (2013.01); F25D 23/062 (2013.01); F25D 23/064 (2013.01); F25D 23/082 (2013.01); *F25D 23/028* (2013.01); *F25D 2201/14* (2013.01); *F25D 2500/02* (2013.01)

(58) Field of Classification Search
  CPC ............... F25D 23/082; F25D 2201/04; F25D 2500/02; F16L 59/065
  See application file for complete search history.

(56) References Cited

U.S. PATENT DOCUMENTS

| | | | |
|---|---|---|---|
| 1,845,353 A | 2/1932 | Snell | |
| 2,000,882 A | 5/1935 | Comstock | |
| 2,708,774 A | 5/1955 | Seelen | |
| 2,715,976 A | 8/1955 | Whitmore | |
| 2,729,863 A | 1/1956 | Kurtz | |
| 2,768,046 A | 10/1956 | Evans | |
| 2,786,241 A | 3/1957 | Garvey et al. | |
| 3,091,946 A | 6/1963 | Kesling | |
| 3,161,265 A | 12/1964 | Matsch et al. | |
| 3,289,423 A | 12/1966 | Berner | |
| 3,370,740 A | 2/1968 | Anderson | |
| 4,056,211 A | 11/1977 | Zumwalt | |
| 4,646,934 A | 3/1987 | McAllister | |
| 4,822,117 A | 4/1989 | Boston, Jr. | |
| 4,959,111 A | 9/1990 | Kruck et al. | |
| 5,011,729 A | 4/1991 | McAllister | |
| 5,018,328 A | 5/1991 | Cur | |
| 5,033,803 A | 7/1991 | Katsuyoshi et al. | |
| 5,185,981 A | 2/1993 | Martinez | |
| 5,200,015 A | 4/1993 | Schilf | |
| 5,361,598 A | 11/1994 | Roseen | |
| 5,512,345 A | 4/1996 | Tsutsumi et al. | |
| 5,532,034 A | 7/1996 | Kirby et al. | |
| 5,694,789 A | 12/1997 | Do | |
| 5,795,639 A | 8/1998 | Lin | |
| 5,843,353 A | 12/1998 | De Vos et al. | |
| 5,947,479 A | 9/1999 | Ostrowski | |
| 6,001,890 A | 12/1999 | Hamilton | |
| 6,029,846 A | 2/2000 | Hirath et al. | |
| 6,038,830 A | 3/2000 | Hirath et al. | |
| 6,109,712 A | 8/2000 | Haworth et al. | |
| 6,168,040 B1 | 1/2001 | Sautner et al. | |
| 6,192,703 B1 | 2/2001 | Salyer et al. | |
| 6,244,458 B1 | 6/2001 | Frysinger et al. | |
| 6,338,536 B1 | 1/2002 | Ueno et al. | |
| 6,485,122 B2 | 11/2002 | Wolf | |
| 8,383,225 B2 | 2/2013 | Rotter | |
| 8,857,931 B2 | 10/2014 | Jung et al. | |
| 8,881,398 B2 | 11/2014 | Hanley et al. | |
| 8,943,770 B2 | 2/2015 | Sanders | |
| 8,944,541 B2 | 2/2015 | Allard et al. | |
| 9,182,158 B2 | 11/2015 | Wu | |
| 9,328,951 B2 | 5/2016 | Shin | |
| 9,441,779 B1 | 9/2016 | Alshourbagy et al. | |
| 9,463,918 B2 | 10/2016 | Reid | |
| 9,752,818 B2 | 9/2017 | Naik | |
| 9,791,204 B2 | 10/2017 | Kim | |
| 9,945,600 B2 | 4/2018 | Kang | |
| 10,082,328 B2 | 9/2018 | Jung et al. | |
| 2002/0041134 A1 | 4/2002 | Wolf et al. | |
| 2002/0100250 A1 | 8/2002 | Hirath et al. | |
| 2002/0170265 A1 | 11/2002 | Tokonabe et al. | |
| 2003/0080126 A1 | 5/2003 | Voute et al. | |
| 2003/0115838 A1 | 6/2003 | Rouanet et al. | |
| 2003/0207075 A1 | 11/2003 | Maignan et al. | |
| 2004/0051427 A1 | 3/2004 | Cittadini et al. | |
| 2004/0091688 A1 | 5/2004 | Gaku | |
| 2004/0226956 A1 | 11/2004 | Brooks | |
| 2005/0175809 A1 | 8/2005 | Hirai et al. | |
| 2005/0235682 A1 | 10/2005 | Hirai et al. | |
| 2007/0152551 A1 | 7/2007 | Kim et al. | |
| 2007/0204648 A1 | 9/2007 | Smale et al. | |
| 2007/0243358 A1 | 10/2007 | Gandini | |
| 2008/0110128 A1 | 5/2008 | Hirath | |
| 2008/0289898 A1 | 11/2008 | Rickards | |
| 2009/0031659 A1 | 2/2009 | Kalfon | |
| 2009/0113899 A1 | 5/2009 | Dain et al. | |
| 2010/0104923 A1 | 4/2010 | Takeguchi et al. | |
| 2010/0178439 A1 | 7/2010 | Bettger et al. | |
| 2011/0089802 A1 | 4/2011 | Cording | |
| 2011/0146333 A1 | 6/2011 | Koo et al. | |
| 2011/0296797 A1 | 12/2011 | Stark et al. | |
| 2012/0103006 A1 | 5/2012 | Jung et al. | |
| 2012/0104923 A1 | 5/2012 | Jung et al. | |
| 2012/0118002 A1 | 5/2012 | Kim et al. | |
| 2012/0125039 A1 | 5/2012 | Hwang | |
| 2012/0128920 A1 | 5/2012 | Yoon et al. | |
| 2012/0231204 A1 | 9/2012 | Jeon et al. | |
| 2012/0269996 A1 | 10/2012 | Jäger | |
| 2012/0326587 A1 | 12/2012 | Jeong et al. | |
| 2013/0008309 A1 | 1/2013 | Hashida | |
| 2013/0026900 A1 | 1/2013 | Oh et al. | |
| 2013/0099650 A1 | 4/2013 | Lee et al. | |
| 2013/0105494 A1 | 5/2013 | Jung | |
| 2013/0105496 A1 | 5/2013 | Jung | |
| 2013/0195544 A1 | 8/2013 | Sanders et al. | |
| 2013/0255304 A1 | 10/2013 | Cur et al. | |
| 2013/0257257 A1 | 10/2013 | Cur | |
| 2013/0293080 A1 | 11/2013 | Kim | |
| 2014/0103791 A1 | 4/2014 | Cheon | |
| 2014/0132142 A1 | 5/2014 | Kim et al. | |
| 2014/0216100 A1 | 8/2014 | Toshimitsu et al. | |
| 2014/0272208 A1 | 9/2014 | Song et al. | |
| 2014/0315011 A1 | 10/2014 | Lee et al. | |
| 2014/0346942 A1 | 11/2014 | Kim et al. | |
| 2015/0030800 A1 | 1/2015 | Jung et al. | |
| 2015/0068401 A1 | 3/2015 | Hashida et al. | |
| 2015/0192356 A1 | 7/2015 | Kang et al. | |
| 2016/0109172 A1 | 4/2016 | Kim et al. | |
| 2016/0356542 A1 | 12/2016 | Kim et al. | |
| 2017/0325634 A1 | 11/2017 | Cai et al. | |
| 2018/0266620 A1 | 9/2018 | Kawarazaki et al. | |
| 2018/0299060 A1 | 10/2018 | Song et al. | |
| 2018/0313492 A1 | 11/2018 | Kitano et al. | |
| 2019/0101320 A1 | 4/2019 | Dherde et al. | |
| 2019/0128593 A1 | 5/2019 | Deka et al. | |

FOREIGN PATENT DOCUMENTS

| | | |
|---|---|---|
| CN | 1276052 | 12/2000 |
| CN | 1286386 | 3/2001 |
| CN | 1515857 | 7/2004 |
| CN | 1576678 | 2/2005 |
| CN | 2700790 | 5/2005 |
| CN | 1666071 | 9/2005 |
| CN | 2748848 | 12/2005 |
| CN | 1731053 | 2/2006 |
| CN | 1820173 | 8/2006 |
| CN | 1896657 | 1/2007 |
| CN | 101072968 | 11/2007 |
| CN | 101171472 | 4/2008 |
| CN | 101349493 | 1/2009 |
| CN | 201191121 | 2/2009 |
| CN | 201428906 | 3/2010 |
| CN | 201764779 | 3/2011 |
| CN | 102032736 | 4/2011 |
| CN | 201811526 | 4/2011 |
| CN | 102099646 | 6/2011 |
| CN | 102116402 | 7/2011 |
| CN | 102261470 | 11/2011 |
| CN | 102455103 | 5/2012 |
| CN | 102455104 | 5/2012 |
| CN | 102455105 | 5/2012 |
| CN | 102735013 | 10/2012 |

(56) References Cited

FOREIGN PATENT DOCUMENTS

| | | |
|---|---|---|
| CN | 102818421 | 12/2012 |
| CN | 102840729 | 12/2012 |
| CN | 102927740 | 2/2013 |
| CN | 103062981 | 4/2013 |
| CN | 103090615 | 5/2013 |
| CN | 103090616 | 5/2013 |
| CN | 103154648 | 6/2013 |
| CN | 103189696 | 7/2013 |
| CN | 103228851 | 7/2013 |
| CN | 203095854 | 7/2013 |
| CN | 103363764 | 10/2013 |
| CN | 103370587 | 10/2013 |
| CN | 103542660 | 1/2014 |
| CN | 103575038 | 2/2014 |
| CN | 103649658 | 3/2014 |
| CN | 103968196 | 8/2014 |
| CN | 104180595 | 12/2014 |
| CN | 104204646 | 12/2014 |
| CN | 104254749 | 12/2014 |
| CN | 104344653 | 2/2015 |
| CN | 104457117 A | 3/2015 |
| CN | 104482707 | 4/2015 |
| CN | 104567215 | 4/2015 |
| CN | 104634047 | 5/2015 |
| CN | 104729201 | 6/2015 |
| CN | 104746690 | 7/2015 |
| CN | 105546923 | 5/2016 |
| CN | 108354755 | 8/2018 |
| DE | 956 899 | 1/1957 |
| DE | 28 02 910 | 8/1978 |
| DE | 29 39 878 | 4/1981 |
| DE | 31 21 351 | 12/1982 |
| DE | 9204365 | 7/1992 |
| DE | 197 45 825 | 4/1999 |
| DE | 1 980 3908 | 8/1999 |
| DE | 299 12 917 | 11/1999 |
| DE | 199 07 182 | 8/2000 |
| DE | 10-2011-050473 | 11/2011 |
| DE | 10 2011 014 302 | 9/2012 |
| DE | 10 2011 079 209 | 1/2013 |
| DE | 10-2012-100490 | 7/2013 |
| DE | 10-2012-223539 | 6/2014 |
| EP | 0 071 090 | 2/1983 |
| EP | 0 658 716 | 6/1995 |
| EP | 0 658 733 | 6/1995 |
| EP | 0 892 120 | 1/1999 |
| EP | 1 477 752 | 11/2004 |
| EP | 1 484 563 | 12/2004 |
| EP | 1 614 954 | 1/2006 |
| EP | 2 333 179 | 6/2011 |
| EP | 2 447 639 | 5/2012 |
| EP | 2 806 239 | 11/2014 |
| EP | 2 824 405 | 1/2015 |
| EP | 2 829 827 | 1/2015 |
| EP | 2 936 013 | 10/2015 |
| EP | 2 952 839 | 12/2015 |
| EP | 2 789 951 | 10/2020 |
| GB | 890372 | 2/1962 |
| GB | 2 446 053 | 7/2008 |
| JP | H04-341694 | 11/1992 |
| JP | H05-10494 | 1/1993 |
| JP | H07-234067 | 9/1995 |
| JP | H09-145241 | 6/1997 |
| JP | 11-211334 | 8/1999 |
| JP | H11335114 | 12/1999 |
| JP | 2002-243091 A | 8/2002 |
| JP | 2003-106760 | 4/2003 |
| JP | 2003-269688 | 9/2003 |
| JP | 2004-044980 | 2/2004 |
| JP | 2004-196411 | 7/2004 |
| JP | 2005-214372 | 8/2005 |
| JP | 2007-218509 | 8/2007 |
| JP | 2008-045580 | 2/2008 |
| JP | 2008-249003 | 10/2008 |
| JP | 2009-078261 | 4/2009 |
| JP | 2010-008011 | 1/2010 |
| JP | 2010008011 | 1/2010 |
| JP | 2012-087993 | 5/2012 |
| JP | 2012-255607 | 12/2012 |
| JP | 2013-119966 A | 6/2013 |
| JP | 2014-037931 | 2/2014 |
| KR | 10-2001-0073363 | 8/2001 |
| KR | 10-0343719 | 7/2002 |
| KR | 10-0411841 | 12/2003 |
| KR | 10-2005-0065088 | 6/2005 |
| KR | 20070052156 | 5/2007 |
| KR | 10-2009-0111632 | 10/2009 |
| KR | 10-2010-0097410 | 9/2010 |
| KR | 10-2010-0099629 | 9/2010 |
| KR | 10-2010-0119937 | 11/2010 |
| KR | 10-2010-0136614 | 12/2010 |
| KR | 10-2011-0015322 | 2/2011 |
| KR | 10-2011-0015325 | 2/2011 |
| KR | 10-2011-0015327 | 2/2011 |
| KR | 10-1041086 | 6/2011 |
| KR | 10-2011-0100440 | 9/2011 |
| KR | 10-2012-0044558 | 5/2012 |
| KR | 10-2012-0139648 | 12/2012 |
| KR | 10-1227516 | 1/2013 |
| KR | 10-2013-0048528 | 5/2013 |
| KR | 10-2013-0048530 | 5/2013 |
| KR | 10-2013-0054213 | 5/2013 |
| KR | 10-2014-0129552 | 11/2014 |
| KR | 10-2015-0012712 | 2/2015 |
| KR | 10-1506413 | 3/2015 |
| NL | 1005962 | 11/1998 |
| RU | 129188 | 6/2013 |
| WO | WO 93/25843 | 12/1993 |
| WO | WO 2006/003199 | 1/2006 |
| WO | WO 2012/084874 | 6/2012 |
| WO | WO 2012/176880 | 12/2012 |
| WO | WO 2013/007568 | 1/2013 |
| WO | WO 2014/049969 | 4/2014 |
| WO | WO 2014/175639 | 10/2014 |
| WO | WO 2016/208193 | 12/2016 |
| WO | WO 2017/023095 | 2/2017 |
| WO | WO 2017/192121 | 11/2017 |
| WO | WO 2018/044274 | 3/2018 |

OTHER PUBLICATIONS

United States Office Action dated Jun. 10, 2022 issued in co-pending related U.S. Appl. No. 16/942,213.
Chinese Office Action issued in Application No. 202010634146.7 dated Jun. 2, 2021.
United States Office Action dated Jul. 7, 2022 issued in co-pending related U.S. Appl. No. 16/710,720.
United States Office Action dated Jul. 13, 2022 issued in co-pending related U.S. Appl. No. 17/134,911.
United States Office Action dated Jul. 26, 2022 issued in co-pending related U.S. Appl. No. 17/030,806.
European Search Report dated Oct. 11, 2021 issued in EP Application No. 21185349.4.
European Search Report dated Oct. 11, 2021 issued in EP Application No. 21185362.7.
Korean Office Action dated Aug. 1, 2021 issued in KR Application No. 10-2021-0085731.
Chinese Office Action dated Aug. 2, 2021 issued in CN Application No. 202010972409.5.
Chinese Office Action dated Aug. 3, 2021 issued in CN Application No. 202010972419.9.
Chinese Office Action dated Aug. 4, 2021 issued in CN Application No. 202010972442.8.
U.S. Office Action issued in Application No. 15/749,132 dated Mar. 30, 2021.
Chinese Office Action and Search Report dated Jul. 20, 2021 issued in Application 20101067100.X.
U.S. Office Action issued in U.S. Appl. No. 15/749,156 dated Jun. 28, 2021.
U.S. Appl. No. 16/942,262, filed Jul. 29, 2020.
U.S. Appl. No. 15/749,156, filed Jan. 31, 2018.

(56) References Cited

OTHER PUBLICATIONS

United States Office Action dated Oct. 5, 2021 issued in co-pending related U.S. Appl. No. 16/942,262.
United States Office Action dated Oct. 19, 2021 issued in co-pending related U.S. Appl. No. 17/021,582.
United States Office Action dated Oct. 26, 2021 issued in co-pending related U.S. Appl. No. 16/942,213.
Chinese Office Action dated Dec. 3, 2021 issued in CN Application No. 202110032077.7.
European Search Report dated Feb. 8, 2022 issued in EP Application No. 21203498.7.
Chinese Office Action dated Feb. 15, 2022 issued in CN Application No. 202010671000.X.
Chinese Office Action dated Feb. 18, 2022 issued in CN Application No. 202010975466.9.
Chinese Office Action dated Apr. 6, 2021 issued in CN Application No. 202010248772.2.
Chinese Office Action dated Apr. 6, 2021 issued in CN Application No. 202010248789.8.
Chinese Office Action dated Apr. 6, 2021 issued in CN Application No. 202010248791.5.
Chinese Office Action dated Apr. 8, 2021 issued in CN Application No. 202010248891.8.
Chinese Office Action dated Jun. 2, 2021 issued in CN Application No. 202010634146.7.
Chinese Office Action dated Jun. 23, 2021 issued in CN Application No. 202010669915.7.
United States Office Action dated Jun. 28, 2021 issued in co-pending related U.S. Appl. No. 15/749,156.
International Search Report and Written Opinion dated Oct. 12, 2016 issued in Application No. PCT/KR2016/008465.
International Search Report and Written Opinion dated Oct. 12, 2016 issued in Application No. PCT/KR2016/008507.
International Search Report and Written Opinion dated Nov. 21, 2016 issued in Application No. PCT/KR2016/008466.
International Search Report and Written Opinion dated Nov. 21, 2016 issued in Application No. PCT/KR2016/008468.
International Search Report and Written Opinion dated Nov. 21, 2016 issued in Application No. PCT/KR2016/008469.
International Search Report and Written Opinion dated Nov. 21, 2016 issued in Application No. PCT/KR2016/008470.
International Search Report and Written Opinion dated Nov. 21, 2016 issued in Application No. PCT/KR2016/008501.
International Search Report and Written Opinion dated Nov. 21, 2016 issued in Application No. PCT/KR2016/008502.
International Search Report and Written Opinion dated Nov. 21, 2016 issued in Application No. PCT/KR2016/008505.
International Search Report and Written Opinion dated Nov. 21, 2016 issued in Application No. PCT/KR2016/008519.
International Search Report and Written Opinion dated Nov. 21, 2016 issued in Application No. PCT/KR2016/008523.
International Search Report and Written Opinion dated Dec. 7, 2016 issued in Application No. PCT/KR2016/008516.
International Search Report and Written Opinion dated Dec. 23, 2016 issued in Application No. PCT/KR2016/008512.
International Search Report and Written Opinion dated Dec. 23, 2016 issued in Application No. PCT/KR2016/008514.
Russian Office Action dated Sep. 25, 2018 issued in RU Application No. 2018107646.
European Search Report dated Dec. 21, 2018 issued in EP Application No. 16833330.0.
European Search Report dated Feb. 13, 2019 issued in EP Application No. 16833309.4.
European Search Report dated Feb. 13, 2019 issued in EP Application No. 16833311.0.
European Search Report dated Feb. 20, 2019 issued in EP Application No. 16833313.6.
European Search Report dated Feb. 22, 2019 issued in EP Application No. 16833312.8.
European Search Report dated Feb. 26, 2019 issued in EP Application No. 16833324.3.
European Search Report dated Feb. 26, 2019 issued in EP Application No. 16833336.7.
European Search Report dated Mar. 1, 2019 issued in EP Application No. 16833323.5.
European Search Report dated Mar. 1, 2019 issued in EP Application No. 16833338.3.
European Search Report dated Mar. 13, 2019 issued in EP Application No. 16833331.8.
European Search Report dated Mar. 15, 2019 issued in EP Application No. 16833326.8.
European Search Report dated Apr. 3, 2019 issued in EP Application No. 16833325.0.
U.S. Office Action dated Jun. 13, 2019 issued in related U.S. Appl. No. 15/749,139.
U.S. Office Action dated Jun. 13, 2019 issued in related U.S. Appl. No. 15/749,142.
U.S. Office Action dated Jun. 13, 2019 issued in related U.S. Appl. No. 15/749,136.
Chinese Office Action (with English translation) dated Jul. 15, 2019 issued in CN Application No. 201680045949.0.
Chinese Office Action (with English translation) dated Aug. 5, 2019 issued in CN Application No. 201680045869.5.
Chinese Office Action (with English translation) dated Aug. 5, 2019 issued in CN Application No. 201680045899.6.
Chinese Office Action (with English translation) dated Aug. 5, 2019 issued in CN Application No. 201680045908.1.
Chinese Office Action (with English translation) dated Aug. 5, 2019 issued in CN Application No. 201680045935.9.
Chinese Office Action (with English translation) dated Aug. 5, 2019 issued in CN Application No. 201680046042.6.
Chinese Office Action (with English translation) dated Aug. 5, 2019 issued in CN Application No. 201680046048.3.
Chinese Office Action (with English translation) dated Aug. 13, 2019 issued in CN Application No. 201680045950.3.
Chinese Office Action (with English translation) dated Sep. 19, 2019 issued in CN Application No. 201680045897.7.
Chinese Office Action (with English translation) dated Sep. 19, 2019 issued in CN Application No. 201680045898.1.
Chinese Office Action (with English translation) dated Sep. 19, 2019 issued in CN Application No. 201680046047.9.
United States Office Action dated Sep. 20, 2019 issued in U.S. Appl. No. 15/749,149.
U.S. Office Action dated Oct. 4, 2019 issued in related U.S. Appl. No. 15/749,140.
U.S. Office Action dated Oct. 17, 2019 issued in U.S. Appl. No. 15/749,147.
U.S. Office Action dated Oct. 17, 2019 issued in U.S. Appl. No. 15/749,143.
U.S. Office Action dated Oct. 17, 2019 issued in U.S. Appl. No. 15/749,162.
United States Office Action dated Dec. 10, 2019 issued in U.S. Appl. No. 15/749,132.
United States Office Action dated Feb. 18, 2020 issued in U.S. Appl. No. 15/749,146.
United States Office Action dated Mar. 20, 2020 issued in U.S. Appl. No. 15/749,162.
United States Office Action dated Mar. 24, 2020 issued in U.S. Appl. No. 15/749,154.
United States Office Action dated Mar. 25, 2020 issued in U.S. Appl. No. 15/749,156.
United States Office Action dated Mar. 27, 2020 issued in U.S. Appl. No. 15/749,149.
United States Office Action dated Apr. 15, 2020 issued in U.S. Appl. No. 15/749,136.
United States Notice of Allowance dated Apr. 15, 2020 issued in U.S. Appl. No. 15/749,140.
Korean Office Action dated Jun. 5, 2020 issued in Application 10-2017-0093784.
Extended European Search Report dated Jul. 10, 2020 issued in Application 20168389.3.

(56) References Cited

OTHER PUBLICATIONS

United States Notice of Allowance dated Aug. 10, 2020 issued in U.S. Appl. No. 15/749,154.
U.S. Office Action dated Sep. 1, 2020 issued in U.S. Appl. No. 15/749,156.
United States Notice of Allowance dated Oct. 21, 2020 issued in U.S. Appl. No. 15/749,154.
United States Office Action dated Mar. 2, 2022 issued in co-pending related U.S. Appl. No. 17/170,005.
Chinese Office Action dated Jun. 24, 2021 issued in CN Application No. 202010669926.5.
U.S. Appl. No. 15/749,132, filed Jan. 31, 2018.
United States Office Action dated Mar. 31, 2022 issued in co-pending related U.S. Appl. No. 16/929,523.
European Office Action dated Jan. 11, 2021 issued in Application No. 16833313.6.
Korean Notice of Allowance dated Nov. 2, 2022 issued in KR Application No. 10-2015-0109720.
United States Office Action dated Dec. 22, 2022 issued in co-pending related U.S. Appl. No. 16/953,846.
Korean Notice of Allowance dated Jun. 1, 2022 issued in KR Application No. 10-2021-0085731.
European Office Action dated Nov. 21, 2022 issued in EP Application No. 20168389.3.
United States Office Action dated Jan. 18, 2023 issued in co-pending related U.S. Appl. No. 16/942,213.
Chinese Notice of Allowance dated Jun. 1, 2022 issued in CN Application No. 202110032072.4.
Korean Office Action dated Aug. 8, 2022 issued in KR Application No. 10-2015-0109622.
U.S. Office Action dated Mar. 20, 2023 issued in co-pending related U.S. Appl. No. 17/030,806.
Machine translation of EP 2 952 839.
United States Office Action dated Nov. 25, 2022 issued in co-pending related U.S. Appl. No. 17/411,659.
U.S. Appl. No. 17/114,950, filed Dec. 8, 2020.
U.S. Appl. No. 17/749,679, filed May 20, 2022.
U.S. Appl. No. 16/929,523, filed Jul. 15, 2020.
U.S. Appl. No. 17/021,582, filed Sep. 15, 2020.
U.S. Appl. No. 17/134,911, filed Dec. 28, 2020.
United States Office Action dated Oct. 6, 2022 issued in co-pending related U.S. Appl. No. 17/072,231.
European Search Report dated Nov. 3, 2022 issued in EP Application No. 22151005.0.
U.S. Appl. No. 17/411,659, filed Aug. 25, 2021.
U.S. Appl. No. 18/091,203, filed Dec. 29, 2022.
U.S. Appl. No. 17/170,005, filed Feb. 8, 2021.
U.S. Appl. No. 17/939,507, filed Sep. 7, 2022.
U.S. Appl. No. 16/942,213, filed Jul. 29, 2020.
U.S. Appl. No. 18/095,658, filed May 20, 2022.
U.S. Appl. No. 17/582,596, filed Jan. 24, 2022.
U.S. Appl. No. 17/030,806, filed Sep. 24, 2020.
U.S. Appl. No. 18/095,658, filed Jan. 11, 2023.
U.S. Appl. No. 16/710,720, filed Dec. 11, 2019.
U.S. Appl. No. 17/980,088, filed Nov. 3, 2022.
U.S. Appl. No. 17/072,231, filed Oct. 16, 2020.
U.S. Appl. No. 16/953,846, filed Nov. 20, 2020.
U.S. Appl. No. 17/155,430, filed Jan. 22, 2021.
U.S. Appl. No. 18/091,040, filed Dec. 29, 2022.
U.S. Office Action dated Apr. 27, 2023 issued in U.S. Appl. No. 17/072,231.
U.S. Notice of Allowance dated Mar. 23, 2023 issued in U.S. Appl. No. 16/953,846.
Korean Office Action dated Jul. 31, 2023 issued in Application 10-2023-0020717.
Chinese Office Action dated Aug. 30, 2023 issued in Application No. 202110718284.8.
Korean Office Action dated Nov. 1, 2023 issued in Application 10-2023-0015566.
Korean Office Action dated Nov. 13, 2023 issued in Application No. 10-2023-0014241.

VACUUM ADIABATIC BODY AND REFRIGERATOR

CROSS-REFERENCE TO RELATED APPLICATIONS

This application is a Continuation of U.S. application Ser. No. 15/749,154, filed on Jan. 31, 2018, which is a U.S. National Stage Application under 35 U.S.C. § 371 of PCT Application No. PCT/KR2016/008505, filed Aug. 2, 2016, which claims priority to Korean Patent Application No. 10-2015-0109627, filed Aug. 3, 2015, whose entire disclosures are hereby incorporated by reference.

U.S. application Ser. No. 15/749,132; Ser. No. 15/749,139; Ser. No. 15/749,136; Ser. No. 15/749,143; Ser. No. 15/749,146; Ser. No. 15/749,156; Ser. No. 15/749,162; Ser. No. 15/749,140; Ser. No. 15/749,142; Ser. No. 15/749,147; Ser. No. 15/749,149; Ser. No. 15/749,179; Ser. No. 15/749,154; Ser. No. 15/749,161, all filed on Jan. 31, 2018, are related and are hereby incorporated by reference in their entirety. Further, one of ordinary skill in the art will recognize that features disclosed in these above-noted applications may be combined in any combination with features disclosed herein.

TECHNICAL FIELD

The present disclosure relates to a vacuum adiabatic body and a refrigerator.

BACKGROUND ART

A vacuum adiabatic body is a product for suppressing heat transfer by vacuumizing the interior of a body thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced. In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding such as Styrofoam (polystyrene). According to the method, additional foaming is not required, and the adiabatic performance of the refrigerator is improved. However, manufacturing cost is increased, and a manufacturing method is complicated.

As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, manufacturing cost is increased, and a manufacturing method is complicated.

As another example, there is an attempt to manufacture all walls of a refrigerator using a vacuum adiabatic body that is a single product. For example, a technique of providing an adiabatic structure of a refrigerator to be in a vacuum state has been disclosed in U.S. Patent Laid-Open Publication No. US 2004/0226956 (Reference Document 3).

However, it is difficult to obtain an adiabatic effect of a practical level by providing the walls of the refrigerator to be in a sufficient vacuum state. Specifically, it is difficult to prevent heat transfer at a contact portion between external and internal cases having different temperatures. Further, it is difficult to maintain a stable vacuum state. Furthermore, it is difficult to prevent deformation of the cases due to a sound pressure in the vacuum state. Due to these problems, the technique of Reference Document 3 is limited to cryogenic refrigerating apparatuses, and is not applied to refrigerating apparatuses used in general households.

DISCLOSURE

Technical Problem

Embodiments provide a vacuum adiabatic body and a refrigerator, which can obtain a sufficient adiabatic effect in a vacuum state and be applied commercially. Embodiments also provide a vacuum adiabatic body which enables a user not to recognize surface bending of a plate member, formed by a vacuum pressure inside the vacuum adiabatic body, and a refrigerator.

Technical Solution

In one embodiment, a vacuum adiabatic body includes: a first plate member defining at least one portion of a wall for a first space; a second plate member defining at least one portion of a wall for a second space having a different temperature from the first space; a sealing part sealing the first plate member and the second plate member to provide a third space that has a temperature between the temperature of the first space and the temperature of the second space and is in a vacuum state; a supporting unit maintaining the third space; a heat resistance unit for decreasing a heat transfer amount between the first plate member and the second plate member; and an exhaust port through which a gas in the third space is exhausted, wherein the supporting unit includes a plurality of bars interposed between the first and second plate members, the plurality of bars being disposed in a grid shape to have a predetermined pitch, a plurality of adjacent bars among the plurality of bars constitute a unit grid, and a surface of each of the first and second plate members, which surrounds the unit grid, is defined as a unit grid area, a bending part that has spots at which the plurality of bars are disposed as highest points and has a spot depressed into the third space at a central portion of the unit grid area as a lowest point is formed in the unit grid area, an angle formed by a straight line connecting the highest point and the lowest point to each other with respect to a plane formed by the highest points in the unit grid area is defined as a bending angle of the bending part, and a plurality of bending parts are formed by the respective unit grid on the surface of each of the first and second plate members, and a bending angle of at least one of the plurality of bending parts is equal to or greater than $0.25*10^{-3}$ rad and equal to or smaller than $1.0*10^{-3}$ rad.

In another embodiment, a vacuum adiabatic body includes: a first plate member defining at least one portion of a wall for a first space; a second plate member defining at least one portion of a wall for a second space having a different temperature from the first space; a sealing part sealing the first plate member and the second plate member to provide a third space that has a temperature between the temperature of the first space and the temperature of the second space and is in a vacuum state; a supporting unit maintaining the third space; a heat resistance unit for decreasing a heat transfer amount between the first plate member and the second plate member; and an exhaust port through which a gas in the third space is exhausted, wherein the supporting unit includes a plurality of bars interposed between the first and second plate members, the plurality of bars being disposed in a grid shape to have a predetermined pitch, a plurality of adjacent bars among the plurality of bars constitute a unit grid, and a surface of each of the first and second plate members, which surrounds the unit grid, is defined as a unit grid area, a bending part that has spots at which the plurality of bars are disposed as highest points and has a spot depressed into the third space at a central portion of the unit grid area as a lowest point is formed in the unit grid area, an angle formed by a straight line connecting the highest point and the lowest point to each other with respect to a plane formed by the highest points in the unit grid area is defined as a bending angle of the bending part, and a plurality of bending parts are formed by the respective unit grids on the surface of each of the first and second plate members.

In still another embodiment, a refrigerator includes: a main body provided with an internal space in which storage goods are stored; and a door provided to open/close the main body from an external space, wherein, in order to supply a refrigerant into the main body, the refrigerator includes: a compressor for compressing the refrigerant; a condenser for condensing the compressed refrigerant; an expander for expanding the condensed refrigerant; and an evaporator for evaporating the expanded refrigerant to take heat, wherein at least one of the main body and the door includes a vacuum adiabatic body, wherein the vacuum adiabatic body includes: a first plate member defining at least one portion of a wall for the internal space; a second plate member defining at least one portion of a wall for the external space; a sealing part sealing the first plate member and the second plate member to provide a vacuum space part that has a temperature between a temperature of the internal space and a temperature of the external space and is in a vacuum state; a supporting unit maintaining the vacuum space part; a heat resistance unit for decreasing a heat transfer amount between the first plate member and the second plate member; and an exhaust port through which a gas in the vacuum space part is exhausted, wherein the supporting unit includes a plurality of bars interposed between the first and second plate members, the plurality of bars being disposed in a grid shape to have a predetermined pitch, a plurality of adjacent bars among the plurality of bars constitute a unit grid, and a surface of each of the first and second plate members, which surrounds the unit grid, is defined as a unit grid area, a bending part that has spots at which the plurality of bars are disposed as highest points and has a spot depressed into the vacuum space part at a central portion of the unit grid area as a lowest point is formed in the unit grid area, an angle formed by a straight line connecting the highest point and the lowest point to each other with respect to a plane formed by the highest points in the unit grid area is defined as a bending angle of the bending part, and a plurality of bending parts are formed by the respective unit grids on the surface of each of the first and second plate members.

Advantageous Effects

According to the present disclosure, it is possible to provide a vacuum adiabatic body having a vacuum adiabatic effect and a refrigerator including the same. Also, it is possible to design a vacuum adiabatic body which enables a user not to recognize surface bending of a plate member, formed by a vacuum pressure inside the vacuum adiabatic body.

MODE FOR INVENTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the disclosure may be practiced. These embodiments are described in sufficient detail to enable those skilled in the art to practice the disclosure, and it is understood that other embodiments may be utilized and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense.

In the following description, the term 'vacuum pressure' means a certain pressure state lower than atmospheric pressure. In addition, the expression that a vacuum degree of A is higher than that of B means that a vacuum pressure of A is lower than that of B.

Figure 1:
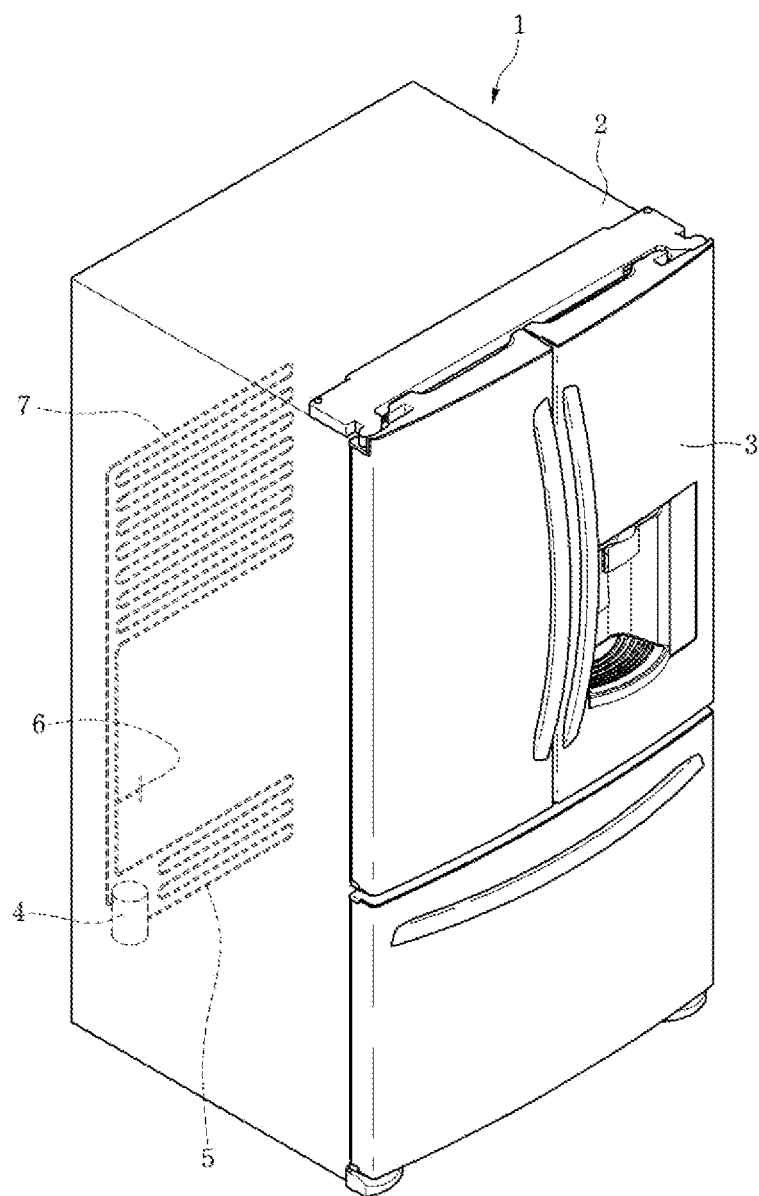
FIG. 1 is a perspective view of a refrigerator according to an embodiment.
Figure 2:
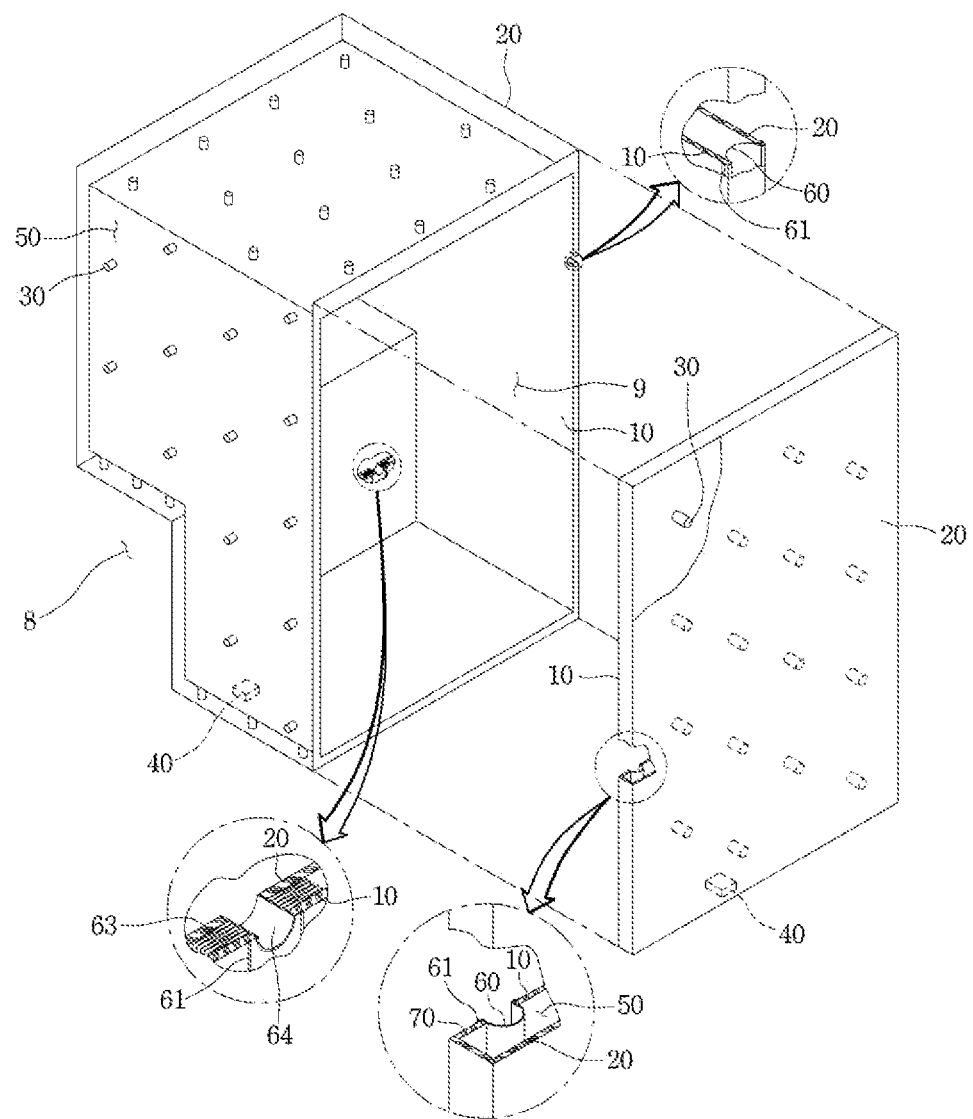
FIG. 2 is a view schematically showing a vacuum adiabatic body used in a main body and a door of the refrigerator.

FIG. 1 is a perspective view of a refrigerator according to an embodiment. FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIGS. 1 and 2, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

Parts constituting a freezing cycle in which cold air is supplied into the cavity 9 may be included. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

The vacuum adiabatic body includes a first plate member (or first plate) 10 for providing a wall of a low-temperature space, a second plate member (or second plate) 20 for providing a wall of a high-temperature space, and a vacuum space part (or vacuum space) 50 defined as a gap part between the first and second plate members 10 and 20. Also, the vacuum adiabatic body includes the conductive resistance sheets 60 and 62 for preventing heat conduction between the first and second plate members 10 and 20.

A sealing part (or seal) 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

Figure 3:
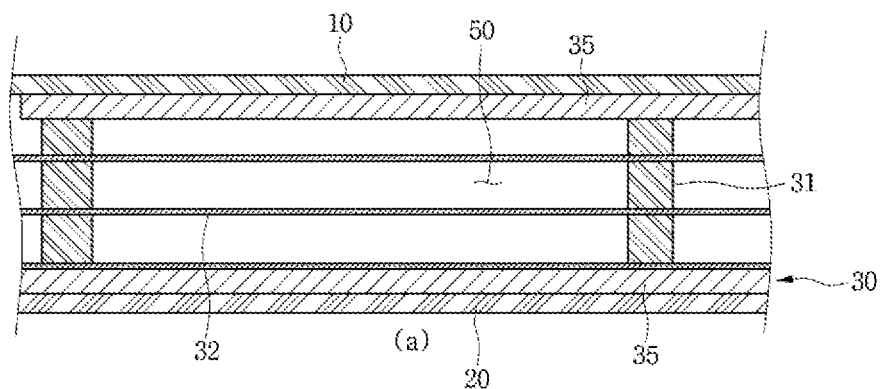
FIG. 3 is a view showing various embodiments of an internal configuration of a vacuum space part.
Figure 3:
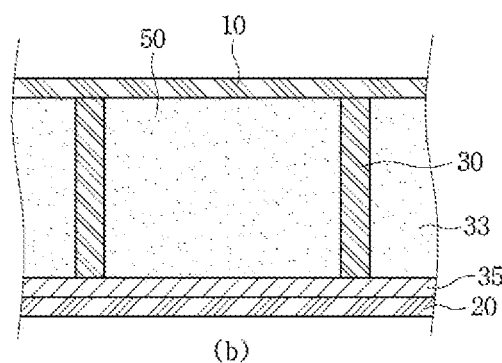
Figure 3:
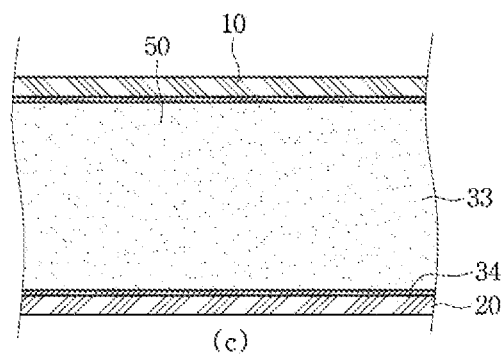

FIG. 3 is a view showing various embodiments of an internal configuration of the vacuum space part. First, referring to FIG. 3a, the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit (or support) 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20.

The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20.

In addition, based on the extending direction of the bars 31, a total sectional area of the support plate 35 is provided to be greater than that of the bars 31, so that heat transferred through the bars 31 can be diffused through the support plate 35. A material of the supporting unit 30 may include a resin selected from the group consisting of PC, glass fiber PC, low outgassing PC, PPS, and LCP so as to obtain high compressive strength, low outgassing and water absorptance, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred.

In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3b, the distance between the plate members is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer. In this embodiment, the vacuum adiabatic body can be manufactured without using the radiation resistance sheet 32.

Referring to FIG. 3c, the supporting unit 30 maintaining the vacuum space part 50 is not provided. Instead of the supporting unit 30, the porous material 33 is provided in a state in which it is surrounded by a film 34. In this case, the porous material 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body can be manufactured without using the supporting unit 30. In other words, the porous material 33 can serve together as the radiation resistance sheet 32 and the supporting unit 30.

Figure 4:
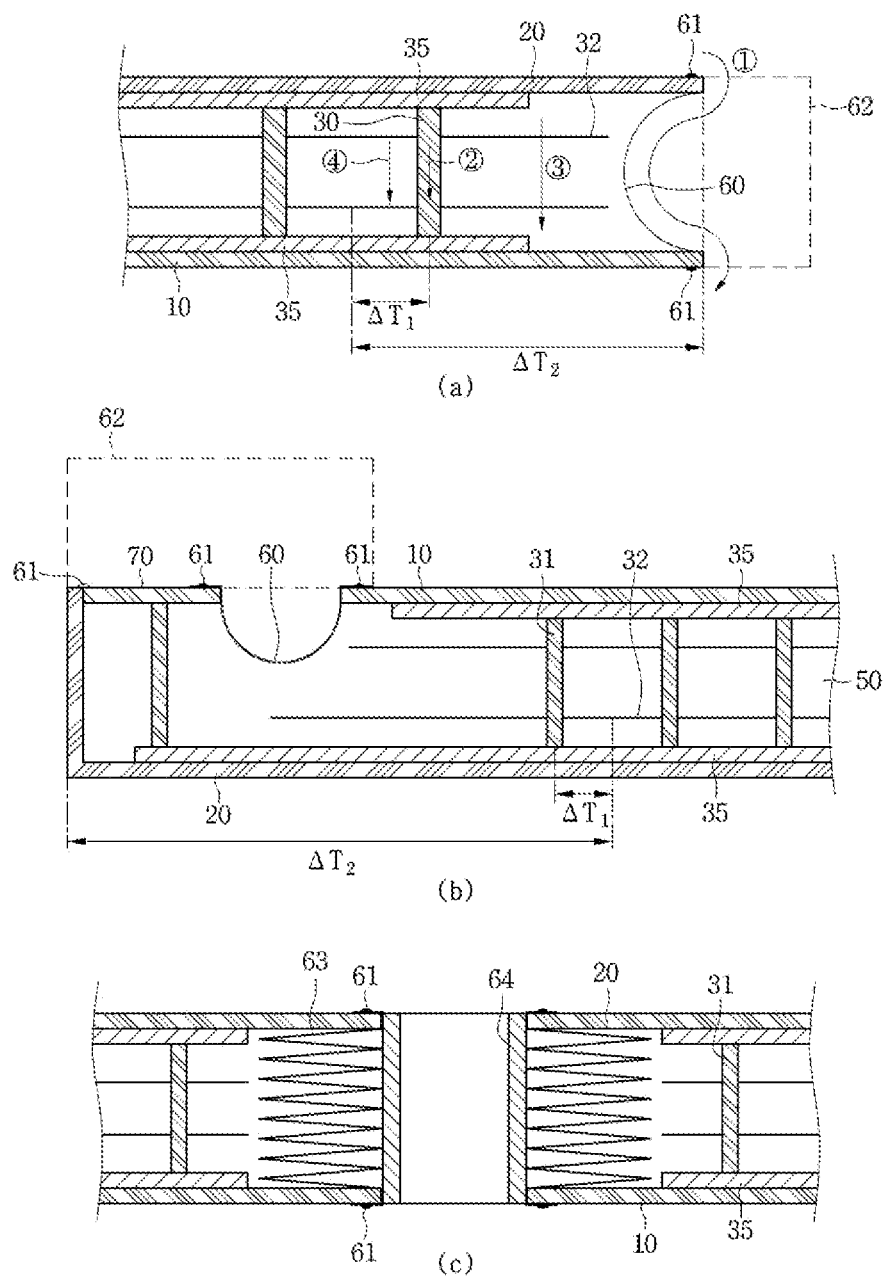
FIG. 4 is a view showing various embodiments of conductive resistance sheets and peripheral parts thereof.

FIG. 4 is a view showing various embodiments of the conductive resistance sheets and peripheral parts thereof. Structures of the conductive resistance sheets are briefly illustrated in FIG. 2, but will be understood in detail with reference to FIG. 4.

First, a conductive resistance sheet proposed in FIG. 4a may be preferably applied to the main body-side vacuum adiabatic body. Specifically, the first and second plate members 10 and 20 are to be sealed so as to vacuumize the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to define at least one portion of the wall for the third space and maintain the vacuum state. The conductive resistance sheet 60 may be provided as a thin foil in units of micrometers so as to reduce the amount of heat conducted along the wall for the third space. The sealing parts 61 may be provided as welding parts. That is, the conductive resistance sheet 60 and the plate members 10 and 20 may be fused to each other.

In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part (or shield) 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous material or a separate adiabatic structure.

A conductive resistance sheet proposed in FIG. 4b may be preferably applied to the door-side vacuum adiabatic body. In FIG. 4b, portions different from those of FIG. 4a are described in detail, and the same description is applied to portions identical to those of FIG. 4a. A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., a corner side portion of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4c may be preferably installed in the pipeline passing through the vacuum space part. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled conductive resistance sheet 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat (or convection) ③ conducted through an internal gas in the vacuum space part, and radiation transfer heat ④ transferred through the vacuum space part.

The transfer heat may be changed depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math FIG. 1.

$$eK_{solidconductionheat} > eK_{radiationtransferheat} > eK_{gasconductionheat} \quad \text{[Math Figure 1]}$$

Here, the effective heat transfer coefficient (eK) is a value that can be measured using a shape and temperature differences of a target product. The effective heat transfer coefficient (eK) is a value that can be obtained by measuring a total heat transfer amount and a temperature of at least one portion at which heat is transferred. For example, a calorific value (W) is measured using a heating source that can be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k = QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit.

Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④, The porous material conduction heat ⑤ may be changed depending on various variables including a kind, an amount, and the like of the porous material.

According to an embodiment, a temperature difference $\Delta T1$ between a geometric center formed by adjacent bars 31 and a point at which each of the bars 31 is located may be preferably provided to be less than 0.5° C. Also, a temperature difference $\Delta T2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest.

For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may be a bad influence on the external appearance of refrigerator. The radiation resistance sheet 32 may be preferably made of a material that has a low emissivity and can be easily subjected to thin film processing. Also, the radiation resistance sheet 32 is to ensure a strength high enough not to be deformed by an external impact. The supporting unit 30 is provided with a strength high enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a predetermined strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness high enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet.

The conductive resistance sheet may be preferably made of a material that is easily deformed by the vacuum pressure and has the lowest stiffness. Even when the porous material 33 is filled in the vacuum space part 50, the conductive resistance sheet may preferably have the lowest stiffness, and the plate member and the side frame may preferably have the highest stiffness.

Hereinafter, a vacuum pressure preferably determined depending on an internal state of the vacuum adiabatic body will be described. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part 50 may resist the heat transfer by applying only the supporting unit 30. Alternatively, the porous material 33 may be filled together with the supporting unit in the vacuum space part 50 to resist the heat transfer. Alternatively, the vacuum space part may resist the heat transfer not by applying the supporting unit but by applying the porous material 33.

Figure 5:
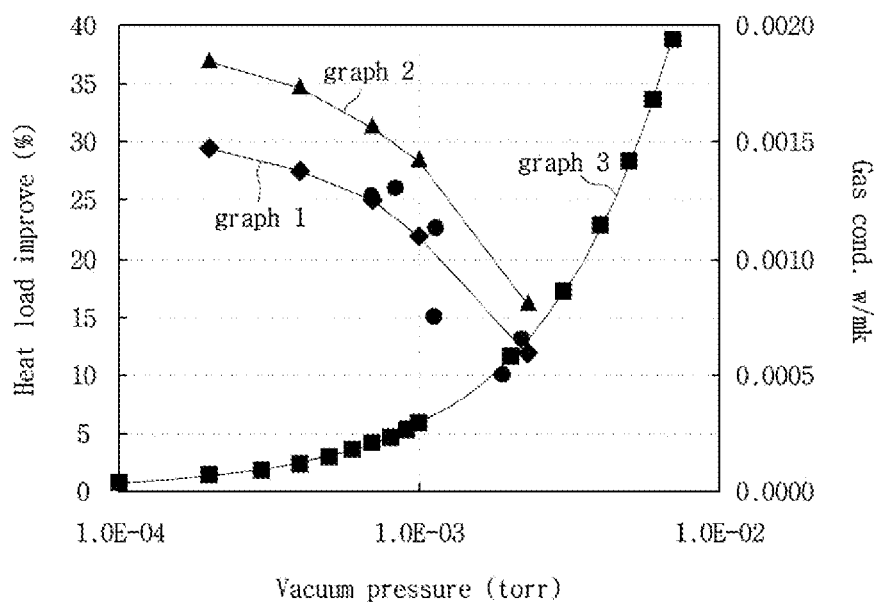
FIG. 5 illustrates graphs showing changes in adiabatic performance and changes in gas conductivity with respect to vacuum pressures by applying a simulation.

The case where only the supporting unit is applied will be described. FIG. 5 illustrates graphs showing changes in adiabatic performance and changes in gas conductivity with respect to vacuum pressures by applying a simulation. Referring to FIG. 5, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased.

However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

Figure 6:
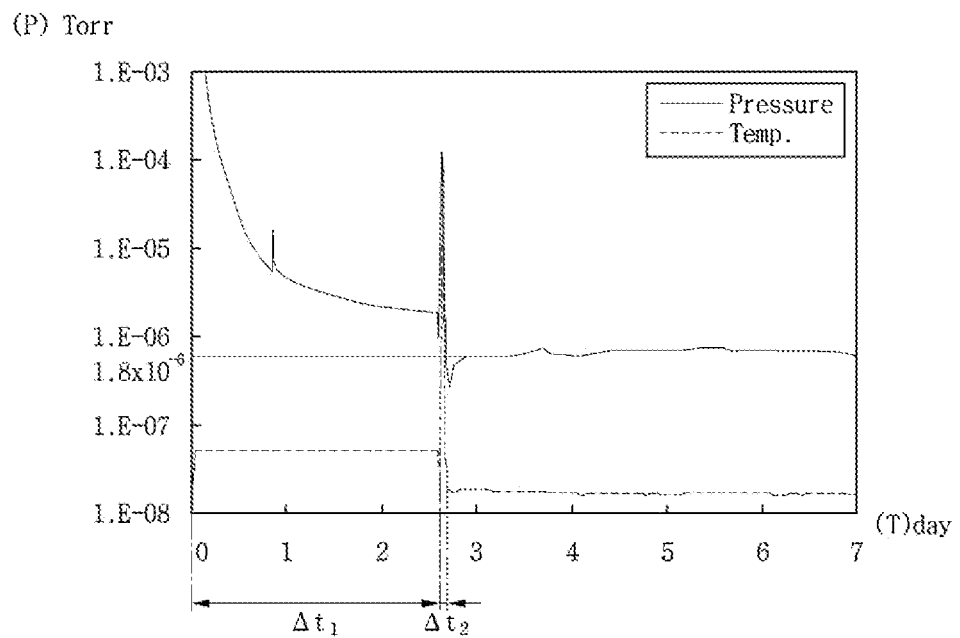
FIG. 6 illustrates graphs obtained by observing, over time and pressure, a process of exhausting the interior of the vacuum adiabatic body when a supporting unit is used.

FIG. 6 illustrates graphs obtained by observing, over time and pressure, a process of exhausting the interior of the vacuum adiabatic body when the supporting unit is used. Referring to FIG. 6, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more (Δt1).

After that, the getter is activated by disconnecting the vacuum space part 50 from the vacuum pump and applying heat to the vacuum space part 50 (Δt2). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{\wedge}(-6)$ Torr. In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{\wedge}(-6)$ Torr.

Figure 7:
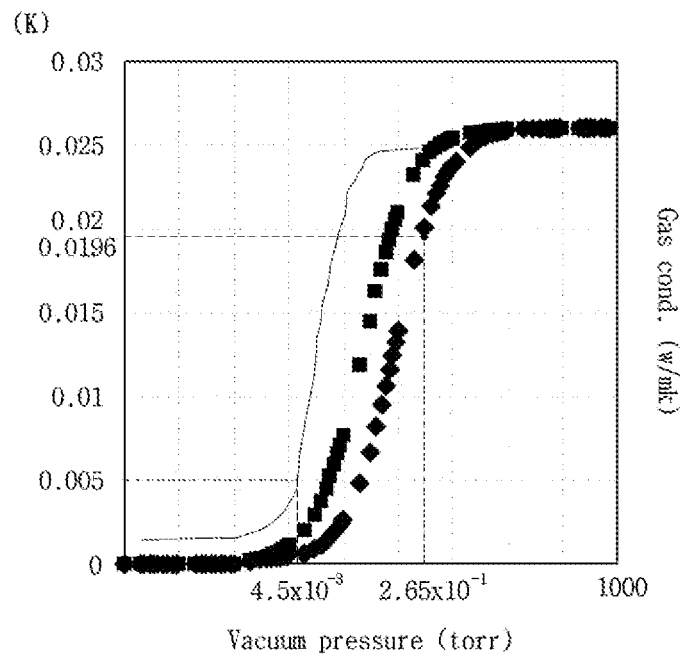
FIG. 7 illustrates graphs obtained by comparing vacuum pressures and gas conductivities.

FIG. 7 illustrates graphs obtained by comparing vacuum pressures and gas conductivities. Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm.

The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to an adiabatic material formed by foaming polyurethane, the vacuum pressure is $2.65 \times 10\bigcirc(-1)$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5 \times 10^{\wedge}(-3)$ Torr. The vacuum pressure of $4.5 \times 10^{\wedge}(-3)$ Torr can be defined as the point at which the reduction in adiabatic effect caused by gas conduction heat is saturated. Also, when the effective heat transfer coefficient is 0.1 W/mK, the vacuum pressure is $1.2 \times 10^{\wedge}(-2)$ Torr.

When the vacuum space part 50 is not provided with the supporting unit but provided with the porous material, the size of the gap ranges from a few micrometers to a few hundredths of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{\wedge}(-4)$ Torr.

Also, the vacuum pressure at the point at which the reduction in adiabatic effect caused by gas conduction heat is saturated is approximately $4.7 \times 10^{\wedge}(-2)$ Torr. Also, the pressure where the reduction in adiabatic effect caused by gas conduction heat reaches the typical effective heat transfer coefficient of 0.0196 W/mK is 730 Torr. When the supporting unit and the porous material are provided together in the vacuum space part, a vacuum pressure may be created and used, which is middle between the vacuum pressure when only the supporting unit is used and the vacuum pressure when only the porous material is used.

Figure 8:
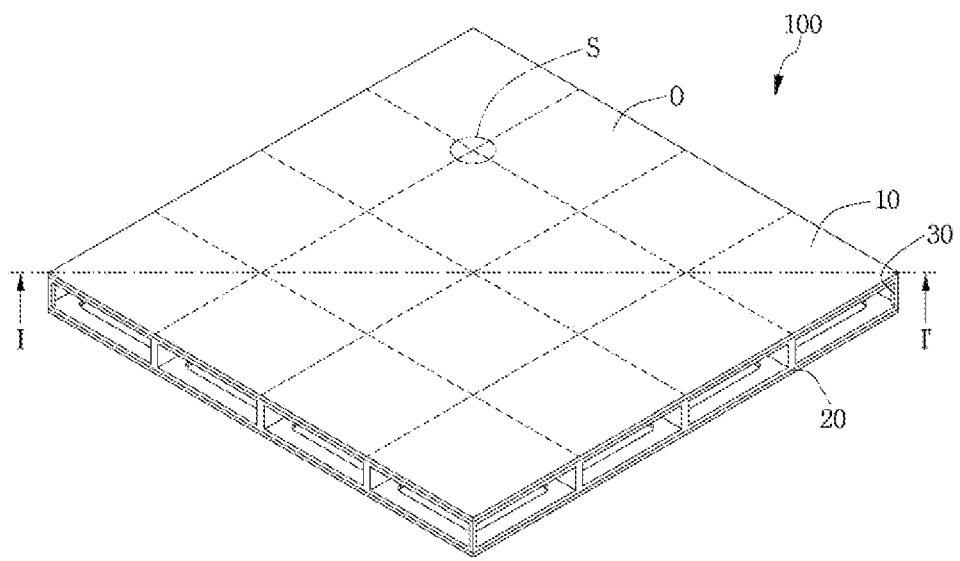
FIG. 8 is a view showing a vacuum adiabatic body according to an embodiment.
Figure 9:
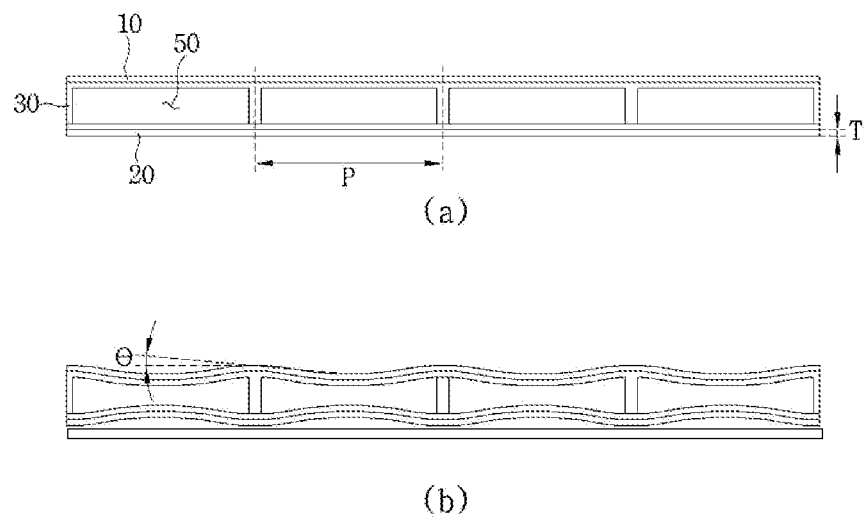
FIG. 9 is a view showing a state in which the vacuum adiabatic body of FIG. 8 is deformed by vacuum pressure.
Figure 10:
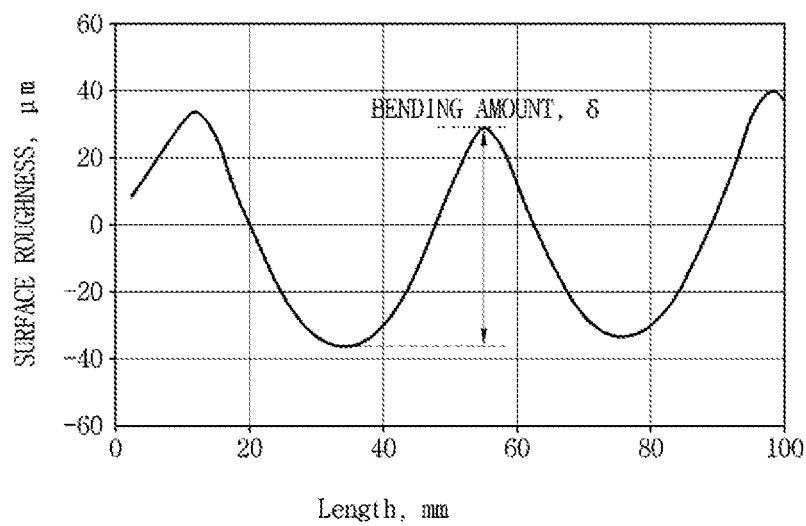
FIG. 10 is a graph showing surface roughnesses of the vacuum adiabatic body of FIG. 9.

FIG. 8 is a view showing a vacuum adiabatic body according to an embodiment. FIG. 9 is a view showing a state in which the vacuum adiabatic body of FIG. 8 is deformed by vacuum pressure. FIG. 10 is a graph showing surface roughnesses of the vacuum adiabatic body of FIG. 9.

Referring to FIGS. 8 to 10, the vacuum adiabatic body 100 according to the embodiment includes a first plate member 10, a second plate member 20, and a supporting unit 30. The supporting unit 30 is interposed between the first plate member 10 and the second plate member 20.

(a) of FIG. 9 is a sectional view taken along line I-I' of FIG. 8, and (b) of FIG. 9 is a view showing a state in which the vacuum adiabatic body is deformed by internal vacuum pressure. The supporting unit 30 includes a plurality of bars, and the bars may be disposed perpendicular to the first and second plate members 10 and 20. Accordingly, the bars function to maintain a distance between the first and second plate members 10 and 20.

The plurality of bars may be disposed to be spaced apart from each other. In FIG. 8, adjacent four bars are disposed to constitute a square unit grid. However, the present disclosure is not limited to such a configuration, and pitches between the plurality of bars may be formed different from each other. The number of bars constituting one unit grid may be changed.

The unit grid is surrounded by the first and second plate members 10 and 20 at both ends thereof, and outer surfaces of the first and second plate members 10 and 20 surrounding the unit grid may be defined as unit grid areas. That is, the unit grid areas refer to surfaces of the plate members 10 and 20, which are exposed to the exterior.

In FIG. 8, the unit grid area refers to one square area O formed by dotted lines on the surface of the first plate member 10. As shown in FIG. 8, spots S at which the plurality of bars are disposed in the unit grid areas is indicated as spots at which dotted lines intersect each other on the surface of the first plate 10.

The plurality of bars support the first and second plate members 10 and 20 under the spots S at which the plurality of bars are disposed. In addition, areas except the plurality of bars are disposed in the unit grid areas O are spaces between the first and second plate members 10.

Since vacuum pressure is formed inside the vacuum adiabatic body 100, a bending part depressed toward a vacuum space part 50 may be formed at each of the surfaces of the first and second plate members 10 and 20. The bending part may be formed in a shape in which it is depressed toward the vacuum space part 50 as it is more distant from each of the spots S at which the plurality of bars are disposed. That is, the bending part has the center spot of the unit grid area O as a lowest point, and has each of the spots S at which the plurality of bars are disposed as a highest point.

If a user recognizes the bending, the user may determine the bending as a product defect. Therefore, the vacuum adiabatic body is to be designed by considering thicknesses of the plate members 10 and 20 and pitches between the plurality of bars.

An angle made by a straight line connecting the highest point and the lowest point to each other with respect to a plane formed by the highest points that are the spots S at which the plurality of bars are disposed is defined as a bending angle θ of the bending part formed in the unit grid area O. As a surface bending angle θ of each of the plate members 10 and 20 is increased, it is highly likely that the user will recognize bending with the naked eye. Here, the surface bending angle θ is determined by a ratio of a surface roughness of each of the plate members 10 and 20 and a pitch P between the plurality of bars.

Hereinafter, the bending angle θ is defined as a slope of the straight line connecting the highest point and the lowest point to each other, and is mathematically defined. A distance in the horizontal direction between the highest point and the lowest point of the unit grid area O is equal to that from the vertex of the unit grid area O to the center of the unit grid area O. Since the pitch between the plurality of bars is P, the length of one side of the square becomes P.

Therefore, the distance in the horizontal direction between the highest point and the lowest point of the unit grid area O becomes P/√2. In addition, a distance in the vertical direction between the highest point and the lowest point on the surface of each of the plate members 10 and 20 is defined as a bending amount δ.

A tangent of the straight line connecting the highest point and the lowest point to each other corresponds to a ratio of the bending amount δ with respect to the distance from the vertex of the unit grid area O to the center of the unit grid area O. Since the bending angle θ is very small, the tangent of the straight line may be approximated as the bending angle θ. Therefore, the bending angle θ is represented by a formula as follows.

$$\theta = \frac{\sqrt{2}\,\delta}{P} \qquad \text{[Math Figure 2]}$$

Meanwhile, a method for decreasing the pitch P between the plurality of bars and a method for increasing the thickness of each of the first and second plate members 10 and 20 are used to reduce surface bending of each of the first and second plate members 10 and 20. It is most ideal that the surface bending angle θ of each of the plate members 10 and 20 becomes 0. However, this may excessively increase the weight of the vacuum adiabatic body 100 and manufacturing costs. Meanwhile, there exists a section in which the user does not recognize surface bending even when the surface bending angle θ is not 0 but has a value in a predetermined range.

Figure 11:
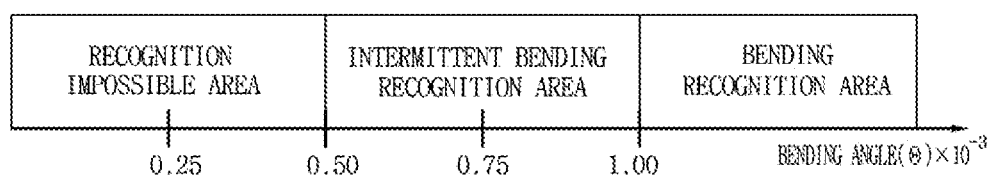
FIG. 11 is a graph showing recognizable areas with respect to sizes of surface bending angles of a plate member.

Hereinafter, a range in which the user does not recognize the surface bending of the plate members 10 and 20 will be described. FIG. 11 is a graph showing recognizable areas with respect to sizes of surface bending angles of the plate member.

Referring to FIG. 11, when the surface bending angle of each of the plate members 10 and 20 is equal to or smaller than $0.5*10^{\wedge}(-3)$ rad, the user does not recognize bending of the surface. Also, when the surface bending angle of each of the plate members 10 and 20 is equal to or greater than $0.5*10^{\wedge}(-3)$ rad and equal to or smaller than $1.0*10^{\wedge}(-3)$ rad, the user intermittently recognizes bending of the surface. Also, when the surface bending angle of each of the plate members 10 and 20 is equal to or greater than $1.0*10^{\wedge}(-3)$ rad, the user can recognize bending of the surface.

The term 'intermittent recognition' refers to a case where only a minority of users can recognize bending of the surface. Therefore, a designer is to determine whether a vacuum adiabatic body is designed as a bending recognition impossible area or an intermittent bending recognition area. When the vacuum adiabatic body 100 is designed, the surface bending angle of each of the plate members 10 and 20 is formed as small as possible, and simultaneously, the following items are to be considered.

First, the thickness of each of the plate members 10 and 20 is formed as thin as possible, which is efficient in terms of weight and material cost. The material of the plurality of bars is used as little as possible, which is efficient in terms of material cost, vacuum maintenance time of the vacuum space part, and heat conduction. In addition, the diameter of each of the plurality of bars is formed to be 1 mm or more, which is effective in terms of strength against deformation and productivity.

However, when the vacuum adiabatic body 100 is used as an adiabatic material constituting the refrigerator, a separate panel may be mounted on the outer surface of the second plate member 20 exposed to the exterior of the refrigerator. Accordingly, it is possible to preventing bending of the second plate member 20 from being exposed to the exterior.

Figure 12:
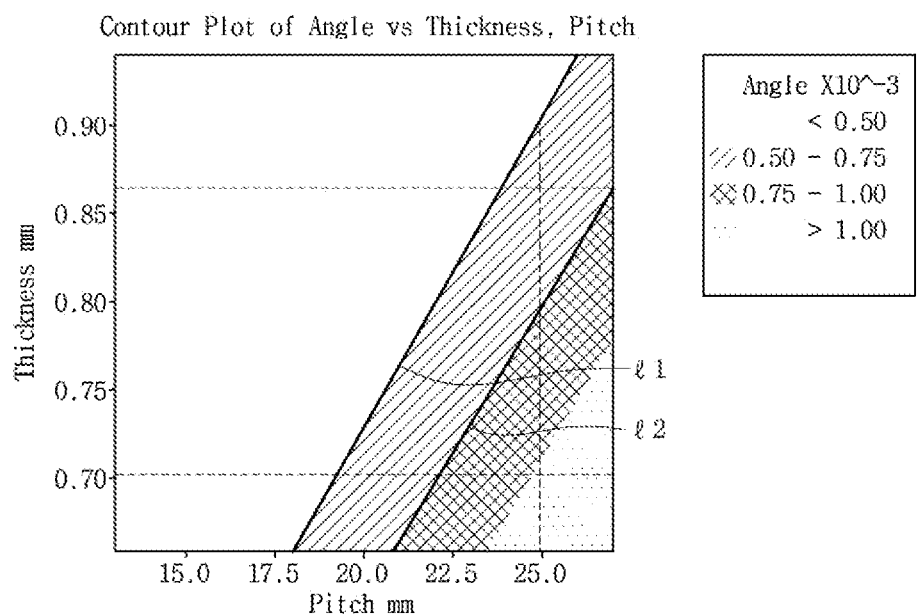
FIG. 12 is a graph showing conditions for thicknesses of the plate member and pitches between the plurality of bars, where the plate member has a predetermined range of bending angles.

Hereinafter, a condition for designing a range of pitch P between the plurality of bars and a range of thicknesses of each of the plate members 10 and 20, which allow the user not to recognize surface bending and satisfy a weight condition, will be described. FIG. 12 is a graph showing a condition for thicknesses of the plate member and pitches between the plurality of bars, where the plate member has a predetermined range of bending angles.

Referring to FIG. 12, in the graph, L1 is a boundary line of a bending recognition impossible area, and L2 is a boundary line of an intermittent bending recognition area. Specifically, an upper side of L1 corresponds to the bending recognition impossible area, and an upper side of L2 between L1 and L2 corresponds to the intermittent bending recognition area.

The horizontal axis P of the graph represents pitches between the plurality of bars, and the vertical axis T represents thicknesses of each of the plate members 10 and 20. L1 has a formula of T=0.033×P+0.067. If T and P are designed so as to satisfy T>0.033×P+0.067, the bending angle of the surface bending part of each of the plate members 10 and 20 is designed to be equal to or smaller than $0.5*10^{\wedge}(-3)$ rad. In this case, the user does not recognize surface bending of each of the plate members 10 and 20.

L2 has a formula of T=0.033×P. If T and P are designed so as to satisfy T>0.033×P, the bending angle of the surface bending part of each of the plate members 10 and 20 is designed to be equal to or smaller than $0.75*10^{\wedge}(-3)$ rad. In this case, the user can intermittently recognize surface bending of each of the plate members 10 and 20.

In FIG. 11, the case where the bending angle of the surface bending part of each of the plate members 10 and 20 is equal to or smaller than $1.0*10^{\wedge}(-3)$ rad has been described as the intermittent bending recognition area. However, the bending angle of the surface bending part of each of the plate members 10 and 20 is preferably designed to be equal to or smaller than $0.75*10^{\wedge}(-3)$ rad by considering errors in design and manufacturing.

Figure 13:
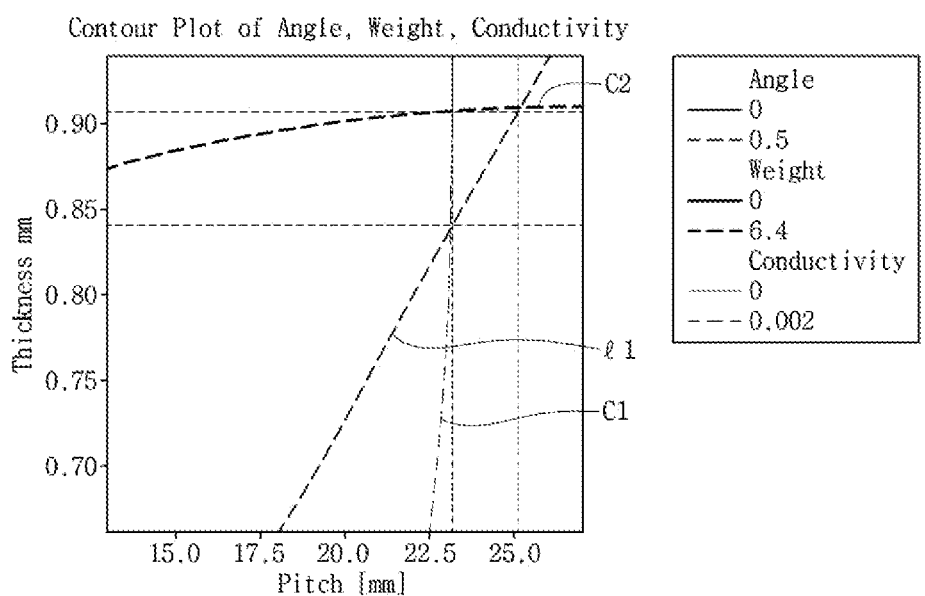
FIG. 13 is a graph showing conditions for thicknesses of the plate member and pitches between the plurality of bars, which satisfy the bending angle of the plate member and the weight and adiabatic performance of the vacuum adiabatic body.

FIG. 13 is a graph showing a condition for thicknesses of the plate member and pitches between the plurality of bars, which satisfy the bending angle of the plate member and the weight and adiabatic performance of the vacuum adiabatic body. Referring to FIG. 13, L1 is the same as L1 of FIG. 12. Therefore, its detailed description will be omitted. In the graph, limiting conditions for a pitch P between the plurality of bars and a thickness T of each of the plate members 10 and 20 may be set so as to perform a design for satisfying the bending angle of the surface of each of the plate members 10 and 20 and satisfying the weight and thermal conductivity of the vacuum adiabatic body.

Curve C1 represents thicknesses T of each of the plate members 10 and 20 and pitches P between the plurality of bars such that the heat conductivity of the vacuum adiabatic body satisfies 0.002 W/mK. Curve C1 is approximately vertically disposed.

In order to decrease the surface bending angle of each of the plate members 10 and 20, the pitch P between the plurality of bars is to be decreased. However, it is preferably designed that P>C1 is satisfied so as to satisfy an adiabatic performance condition by decreasing the thermal conductivity.

Meanwhile, Curve C1 is formed in a shape in which its lower end portion is slightly biased to the left side. This is because, when the thickness of each of the plate members 10 and 20 is thinner than a predetermined value, the thermal conductivity is constantly maintained even when the pitch P is small.

Curve C2 represents thicknesses T of each of the plate members 10 and 20 and pitches P between the plurality of bars, which allow the vacuum adiabatic body to have a constant weight. Curve C2 is almost horizontally disposed.

In order to decrease the surface bending angle of each of the plate members 10 and 20, the thickness T of each of the plate members 10 and 20 is to be increased. However, it is preferably designed that T<C2 is satisfied so as to satisfy a weight condition of the vacuum adiabatic body.

Meanwhile, Curve C2 forms a right upward curve. This is because the weight of the entire vacuum adiabatic body is decreased by decreasing the number of bars as the pitch P is increased, and the thickness T of each of the plate members 10 and 20 is increased as the weight of the entire vacuum adiabatic body is decreased.

Therefore, the thickness T of each of the plate members 10 and 20 and the pitch P between the plurality of bars are to be designed to satisfy three inequalities of T>0.033×P+0.067, T<C1, and P>C2. This means an area forming an inverted triangle in the graph.

Consequently, the thickness T of each of the plate members 10 and 20 is preferably designed to be equal to or greater than 0.84 mm and equal to or smaller than 0.92 mm, and the pitch P between the plurality of bars is preferably designed to be equal to or greater than 23 mm and equal to or smaller than 25 mm. Particularly, it is ideal that the thickness T of each of the plate members 10 and 20 is designed to be 0.9 mm, and the pitch P between the plurality of bars is designed to be 23 mm. In this case, the bending angle is $0.385*10^{(-3)}$ rad, and the weight and thermal conductivity of the vacuum adiabatic body maintain the existing levels.

The vacuum adiabatic body proposed in the present disclosure may be preferably applied to refrigerators. However, the application of the vacuum adiabatic body is not limited to the refrigerators, and may be applied in various apparatuses such as cryogenic refrigerating apparatuses, heating apparatuses, and ventilation apparatuses.

According to the present disclosure, the vacuum adiabatic body can be industrially applied to various adiabatic apparatuses. The adiabatic effect can be enhanced, so that it is possible to improve energy use efficiency and to increase the effective volume of an apparatus.

What is claimed is:

1. A vacuum adiabatic body comprising:
a first plate having a predetermined thickness;
a second plate having the predetermined thickness; and
a seal that seals a space between the first plate and the second plate to form a vacuum state;
a plurality of posts extending between the first plate and the second plate, the plurality of posts being arranged in a grid having a predetermined pitch, wherein:
a distance between the first and second plates is greatest at a position corresponding to a position of one of the plurality of posts, and the distance between the first and second plates is smallest at a position that is furthest away from any one of the plurality of posts, and
when the predetermined thickness is T and the predetermined pitch is P, an inequality of T>0.033×P+0.067 is satisfied.

2. The vacuum adiabatic body according to claim 1, wherein, when the predetermined thickness is T, and the predetermined pitch is P, an inequality of T>0.032 ×P is satisfied.

3. The vacuum adiabatic body according to claim 1, wherein a vacuum degree of the space is equal to or greater than $1.8 \times 10^{-6}$ Torr and equal to or smaller than $2.65 \times 10^{-1}$ Torr.

4. The vacuum adiabatic body according to claim 3, wherein the vacuum degree of the space is equal to or greater than $4.5 \times 10^{\wedge-3}$ Torr and equal to or smaller than $1.2 \times 10^{\wedge-2}$ Torr.

5. The vacuum adiabatic body according to claim 3, wherein the vacuum degree of the space is equal to or greater than $2.0 \times 10^{\wedge-4}$ Torr and equal to or smaller than $4\ 7 \times 10^{-2}$ Torr.

6. The vacuum adiabatic body according to claim 1, wherein there is a predetermined proportion between the predetermined thickness and the predetermined pitch.

7. The vacuum adiabatic body according to claim 1, wherein the plurality of posts are part of a support, and the support is configured such that a solid conduction heat transfer between the first and second plates is greater than a radiation heat transfer between the first and second plates, and a gas conduction heat transfer between the first and second plates is less than the radiation heat transfer.

8. The vacuum adiabatic body according to claim 1, wherein:
the first plate is configured to be exposed to a first space having a first temperature, the first space being an external space and the first temperature being an ambient temperature of the external space;
the second plate is configured to be exposed to a second space, the second space being configured to be cooled to a second temperature lower than the first temperature; and
the space between the first and second plates is configured to have a third temperature when:
the first plate is exposed to the first space,
the second plate is exposed to the second space and the second space is cooled to the second temperature, and
the space between the first and second plates is sealed by the seal.

9. The vacuum adiabatic body according to claim 1, wherein a diameter of the post is equal to or greater than 1 mm.

10. A refrigerator including the vacuum adiabatic body of claim 8, wherein the second plate forms at least a portion of a wall defining an inside of the refrigerator such that the second space is the inside of the refrigerator, and the second temperature is a temperature configured to preserve food.

11. A vacuum adiabatic body, comprising:
a first plate having a first thickness;
a second plate having the first thickness;
a seal that seals a space between the first plate and the second plate to form a vacuum state; and
a support having a plurality of posts extending between the first and second plates and arranged in a grid having a predetermined pitch, wherein:
a distance between the first and second plates is greatest at a position corresponding to a position of one of the plurality of posts, and the distance between the first and second plates is smallest at a position that is furthest away from any one of the plurality of posts,
the support is configured such that a solid conduction heat transfer between the first and second plates is greater than a radiation heat transfer between the first and second plates, and a gas conduction heat transfer between the first and second plates is less than the radiation heat transfer, and the predetermined pitch has a value greater than a value required for a heat conductivity of the space to be 0.002 W/mK regardless of a value of the first thickness to vary.

12. The vacuum adiabatic body according to claim 11, wherein a vacuum degree of the space is equal to or greater than $1.8 \times 10^{-6}$ Torr and equal to or smaller than $2.65 \times 10^{-1}$ Torr.

13. The vacuum adiabatic body according to claim 11, wherein:

the predetermined pitch has a value greater than a value required for a weight of the vacuum adiabatic body to be 6.4 kg regardless of a value of the first thickness to vary.

14. The vacuum adiabatic body of claim 11, wherein the predetermined pitch is greater than or equal to 23 millimeters (mm) and less than or equal to 25 millimeters (mm).

15. The vacuum adiabatic body according to claim 11, wherein:

the first thickness of the first plate is a predetermined thickness T; and when the predetermined pitch is P and the predetermined thickness is T, an inequality of $T > 0.033 \times P + 0.067$ is satisfied.

16. The vacuum adiabatic body according to claim 11, wherein:

the second plate is configured to be exposed to an external space having an ambient temperature;

the second plate has a first area corresponding to the grid of the posts; and a geometric center of the first area has a first temperature, which is configured to be a lowest temperature of the second plate.

17. The vacuum adiabatic body according to claim 16, wherein a temperature difference between the first temperature and a temperature at a position of the second plate corresponding to a location of one of the plurality of posts is configured to be less than 0.5° C.

18. The vacuum adiabatic body according to claim 11, wherein the support is made of a material which has a lower emissivity than that of the first and second plates.

19. The vacuum adiabatic body according to claim 11, wherein the stiffness of the first and the second plates is bigger than the support.

20. A vacuum adiabatic body comprising:

a first plate;

a second plate;

a seal that seals a space between the first plate and the second plate to form a vacuum state; and a plurality of posts extending between the first and second plates and arranged in a grid, wherein:

a distance between the first and second plates is greatest at a first position corresponding to a position of one of the plurality of posts, and the distance between the first and second plates is smallest at a second position that is furthest away from any one of the plurality of posts, and a bending angle is equal to or greater than $0.25 \times 10^{-3}$ radians (rad) and less than or equal to $1.0 \times 10^{-3}$ rad, the bending angle being defined between:

a straight line connecting the first and second positions, and a plane formed by a plurality of first positions.

* * * * *